US008325121B2

(12) United States Patent
Chen et al.

(10) Patent No.: US 8,325,121 B2
(45) Date of Patent: Dec. 4, 2012

(54) METHOD FOR DRIVING PIXEL

(75) Inventors: Chao-Yuan Chen, Hsinchu (TW); Wen-Hao Hsu, Hsinchu (TW); Ting-Wei Su, Hsinchu (TW); Jenn-Jia Su, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 773 days.

(21) Appl. No.: 11/962,083

(22) Filed: Dec. 20, 2007

(65) Prior Publication Data

US 2009/0102865 A1 Apr. 23, 2009

(30) Foreign Application Priority Data

Oct. 18, 2007 (TW) ............................... 96139009 A

(51) Int. Cl.
*G06F 3/038* (2006.01)
*G06G 5/00* (2006.01)

(52) U.S. Cl. ........................................ 345/89; 345/690

(58) Field of Classification Search .................... 345/89, 345/690, 87, 204
See application file for complete search history.

(56) References Cited

U.S. PATENT DOCUMENTS

| | | | | |
|---|---|---|---|---|
| 5,489,917 | A | 2/1996 | Ikezaki et al. | |
| 6,380,917 | B2 * | 4/2002 | Matsueda et al. | 345/89 |
| 6,801,220 | B2 | 10/2004 | Greier et al. | |
| 2002/0060657 | A1 * | 5/2002 | Matsueda et al. | 345/89 |
| 2005/0253797 | A1 * | 11/2005 | Kamada et al. | 345/89 |

* cited by examiner

*Primary Examiner* — Amare Mengistu
*Assistant Examiner* — Insa Sadio
(74) *Attorney, Agent, or Firm* — Jianq Chyun IP Office

(57) ABSTRACT

A method for driving a pixel is provided. The method includes determining a first predetermined gray-level and a second predetermined gray-level which are corresponding to a target gray-level according to the target gray-level of the pixel, wherein an equivalent gray-level corresponding to the first predetermined gray-level and the second predetermined gray-level is equal to the target gray-level, thereafter, generating a first driving voltage and a second driving voltage according to the first predetermined gray-level and the second predetermined gray-level for respectively driving a first sub-pixel and a second sub-pixel within the pixel during a frame period. The first driving voltage is greater than the second driving voltage when the equivalent gray-level is small than a first setting gray-level; the first driving voltage is small than the second driving voltage when the equivalent gray-level is greater than the first setting gray-level.

8 Claims, 8 Drawing Sheets

METHOD FOR DRIVING PIXEL

CROSS-REFERENCE TO RELATED APPLICATION

This application claims the priority benefit of Taiwan application serial no. 96139009, filed on Oct. 18, 2007. The entirety of the above-mentioned patent application is hereby incorporated by reference herein and made a part of this specification.

BACKGROUND OF THE INVENTION

1. Field of the Invention

The present invention relates to a driving method for a flat panel display device. More particularly, the present invention relates to a pixel driving method which achieves a low colour washout of a liquid crystal display (LCD).

2. Description of Related Art

Since an LCD has such advantages as high image quality, high space utilization efficiency, low power consumption and no radiation etc., it has gradually become popular in the market. Presently, features such as high contrast ratio, fast response and wide viewing angle are general requirements of the LCD in the market. The wide viewing angle may be achieved based on techniques such as multi-domain vertically alignment (MVA), multi-domain horizontal alignment (MHA), twisted nematic plus wide viewing film (TN+film) and in-plane switching (IPS).

FIG. 1 is a schematic diagram illustrating a gamma curve A actually measured based on a large viewing angle of an LCD (hereinafter referred to as side viewing angle gamma curve) and a gamma curve B actually measured based on a direct viewing angle of the LCD (hereinafter referred to as direct viewing angle gamma curve). Pixel resolution of the LCD is 8 bits (i.e. 0~255 gray levels), and the horizontal axis and the vertical axis respectively represent gray levels and transmittances. Referring to FIG. 1, though the LCD may achieve the wide viewing angle effect according to the aforementioned techniques, in an actual situation, since the side viewing angle gamma curve A is different from the direct viewing angle gamma curve B, when an observer observes an image displayed by the LCD at a relatively large viewing angle (for example 60 degrees), the observed image colour will be different from the image colour observed at a direct viewing angle, and this is the so-called colour washout phenomenon.

To mitigate the colour washout phenomenon appeared under large viewing angle of the LCD, a solution is to divide each of the pixels within the LCD panel into two sub-pixels which may be independently driven, and the transmittance of one of the sub-pixels is constantly greater than that of another sub-pixel, namely, luminance of the sub-pixel with relatively high transmittance is constantly greater than that of the sub-pixel with relatively low transmittance. Therefore, a colour with a middle gray level may be obtained by mixing the colour having relatively high gray level with the colour having relatively low gray level, such that not only the colour washout phenomenon appeared under large viewing angle of the LCD is mitigated, but also similar colour performance of the displayed images may be achieved when the displayed images of the LCD is viewed at the direct viewing angle or the side viewing angle.

However, since one of the sub-pixels is constantly brighter than another sub-pixel, based on such solution, the colour washout phenomenon of the colours with a low gray level and a high gray level may be mitigated perfectly, however, mitigation of the colour washout phenomenon of the colours with a middle and relatively high gray level is limited. Therefore, colour washout phenomenon appeared under large viewing angle of the LCD will still be severe when the displayed images mostly have the colours with the middle and the relatively high gray levels.

SUMMARY OF THE INVENTION

Accordingly, the present invention is directed to a pixel driving method, by which when an equivalent gray level obtained after at least two independent sub-pixels within a pixel are respectively driven is equal to or greater than a setting gray level, one of the sub-pixels is not constantly brighter than another sub-pixel, such that a colour washout phenomenon of colours of all gray levels is mitigated.

The present invention is directed to a pixel driving method, by which when an equivalent gray level obtained after a pixel is separately driven within a frame period is equal to or greater than a setting gray level, luminance of the pixel is constantly brighter or constantly darker within a non-fixed time segment of the frame period, such that a colour washout phenomenon of colours of all gray levels is mitigated.

The present invention provides a pixel driving method, by which the pixel includes at least a first sub-pixel and a second sub-pixel, and the driving method is as follows. First, a first predetermined gray level and a second predetermined gray level which are corresponding to a target gray level are determined according to the target gray level of the pixel, wherein an equivalent gray level corresponding to the first predetermined gray level and the second predetermined gray level is equal to the target gray level.

Next, a first driving voltage and a second driving voltage are generated according to the first predetermined gray level and the second predetermined gray level for respectively driving the first sub-pixel and the second sub-pixel during a frame period, wherein the first driving voltage is greater than the second driving voltage when the equivalent gray level is less than a first setting gray level, and the first driving voltage is less than the second driving voltage when the equivalent gray level is equal to or greater than the first setting gray level.

The present invention provides another pixel driving method including the following steps. First, a first predetermined gray level and a second predetermined gray level which are corresponding to a target gray level are determined according to the target gray level of the pixel, wherein an equivalent gray level corresponding to the first predetermined gray level and the second predetermined gray level is equal to the target gray level. Next, a first driving voltage is generated according to the first predetermined gray level within a first sub-frame period of a frame period, so as to drive the pixel.

Finally, a second driving voltage is generated according to the second predetermined gray level within a second sub-frame period of the frame period, so as to drive the pixel, wherein the first driving voltage is greater than the second driving voltage when the equivalent gray level is less than a first setting gray level, and the first driving voltage is less than the second driving voltage when the equivalent gray level is equal to or greater than the first setting gray level.

In an embodiment of the present invention, the first predetermined gray level and the second predetermined gray level are determined by a look-up table.

In an embodiment of the present invention, the first driving voltage is greater than the second driving voltage when the equivalent gray level is equal to or greater than a second setting gray level, wherein the second setting gray level is greater than the first setting gray level.

In an embodiment of the present invention, the first driving voltage is less than the second driving voltage when the equivalent gray level is equal to or greater than a third setting gray level, wherein the third setting gray level is greater than the second setting gray level.

In an embodiment of the present invention, the first setting gray level, the second setting gray level and the third setting gray level are determined by a gamma curve actually measured under a direct viewing angle and a gamma curve actually measured under a side viewing angle.

In an embodiment of the present invention, an area ratio of the first sub-pixel and the second sub-pixel is between 3:7 and 4:6.

In an embodiment of the present invention, a timing ratio of the first sub-frame period and the second sub-frame period is between 3:7 and 4:6.

To mitigate the colour washout phenomenon of the colours of all gray levels, the present invention provides two pixel driving methods. One pixel driving method is based on a spatial concept, by which when an equivalent gray level obtained after at least two independent sub-pixels within a pixel are respectively driven is equal to or greater than a setting gray level, one of the sub-pixels is not constantly brighter than another sub-pixel.

Another pixel driving method is based on a temporal concept, by which when an equivalent gray level obtained after a pixel is separately driven within a frame period is equal to or greater than a setting gray level, the pixel is constantly bright or constantly dark within a non-fixed time segment of the frame period. However, no matter which pixel driving method is applied, the colour washout phenomenon of the colours of all gray levels is mitigated, and therefore the colour washout phenomenon appeared under large viewing angle of the LCD may be effectively solved.

In order to make the aforementioned and other objects, features and advantages of the present invention comprehensible, a preferred embodiment accompanied with figures is described in detail below.

DESCRIPTION OF EMBODIMENTS

A technique effect to be achieved by the present invention is to mitigate a colour washout phenomenon of colours of all gray levels so as to effectively solve the colour washout phenomenon appeared under large viewing angle of an LCD. The technique features of the present invention and technique effects to be achieved by the present invention will be described in detail below for those skilled in the art.

Figure 1:
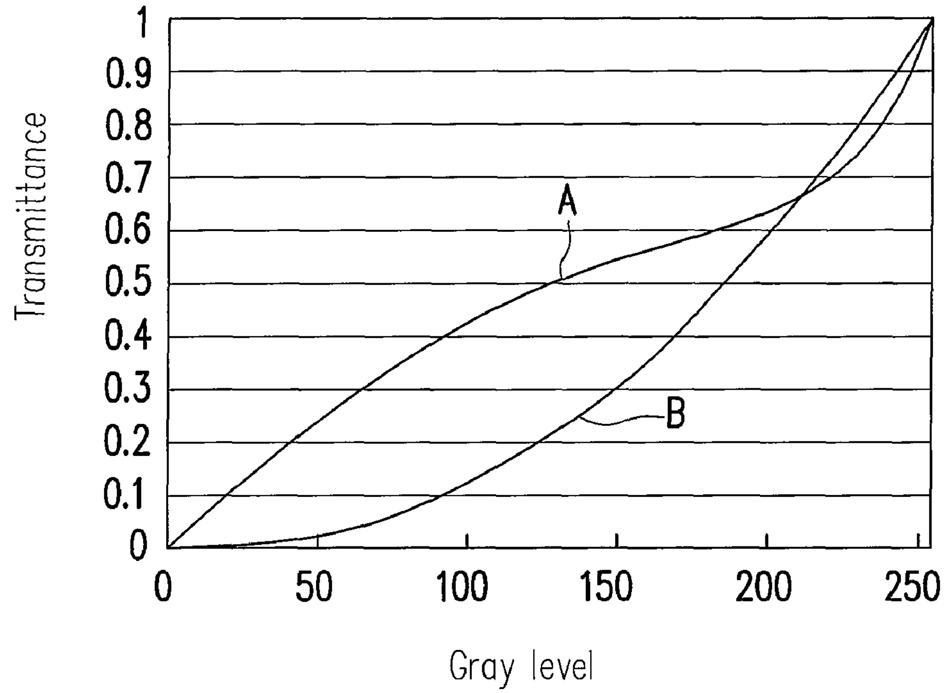
FIG. 1 is a schematic diagram illustrating a gamma curve A actually measured based on a large viewing angle of an LCD and a gamma curve B actually measured based on a direct viewing angle of the LCD.
Figure 2:
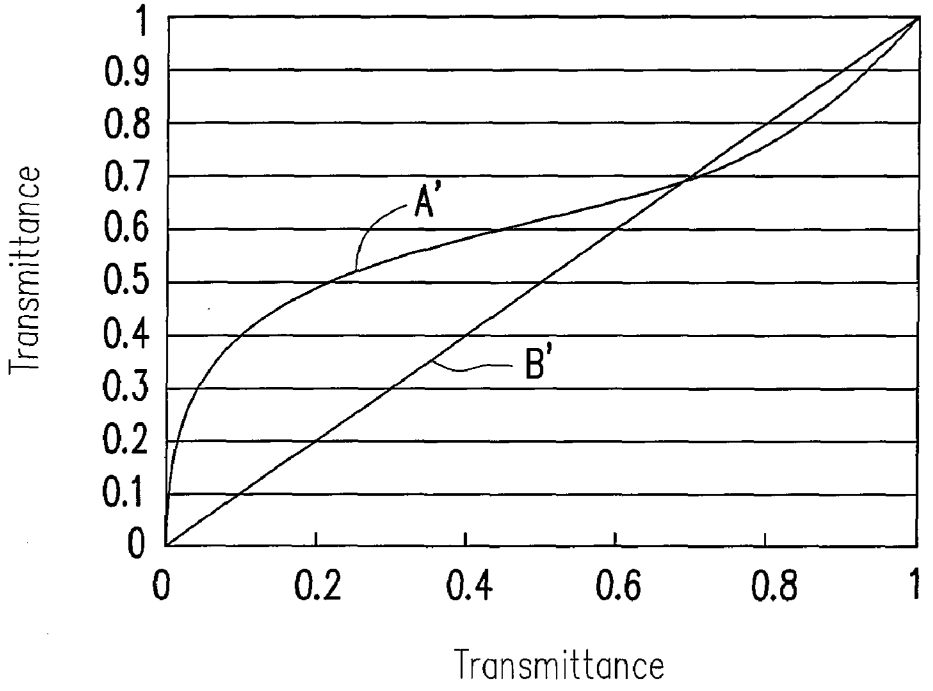
FIG. 2 is a schematic diagram illustrating a normalized side viewing angle gamma curve A' and a normalized direct viewing angle gamma curve B'.

Referring to FIG. 1, since a side viewing angle gamma curve A is different from a direct viewing angle gamma curve B, the colour washout phenomenon is appeared under large viewing angle of the LCD. Referring to FIG. 2, if the side viewing angle gamma curve A and the direct viewing angle gamma curve B of FIG. 1 are normalized according to the direct viewing angle gamma curve B, a normalized side viewing angle gamma curve A' and a normalized direct viewing angle gamma curve B' are then obtained.

Theoretically, the more a slope of the normalized side viewing angle gamma curve A' closes to the slope (i.e. equal to 1) of the normalized direct viewing angle gamma curve B', the more the colour washout phenomenon appeared under large viewing angle of the LCD may be mitigated. Therefore, in the two pixel driving methods provided by the present invention, the normalized side viewing angle gamma curve A' is adjusted for closing up to the normalized direct viewing angle gamma curve B', while maintaining the normalized direct viewing angle gamma curve B' unchanged.

Accordingly, the pixel driving method based on a spatial concept is first described below. In this method, each pixel of the LCD panel includes two or more sub-pixels with a different area ratio and may be independently driven. First, each pixel of the LCD panel is assumed to include two sub-pixels which may be independently driven, and the area ratio of the two sub-pixels is 1:2.

Figure 3:
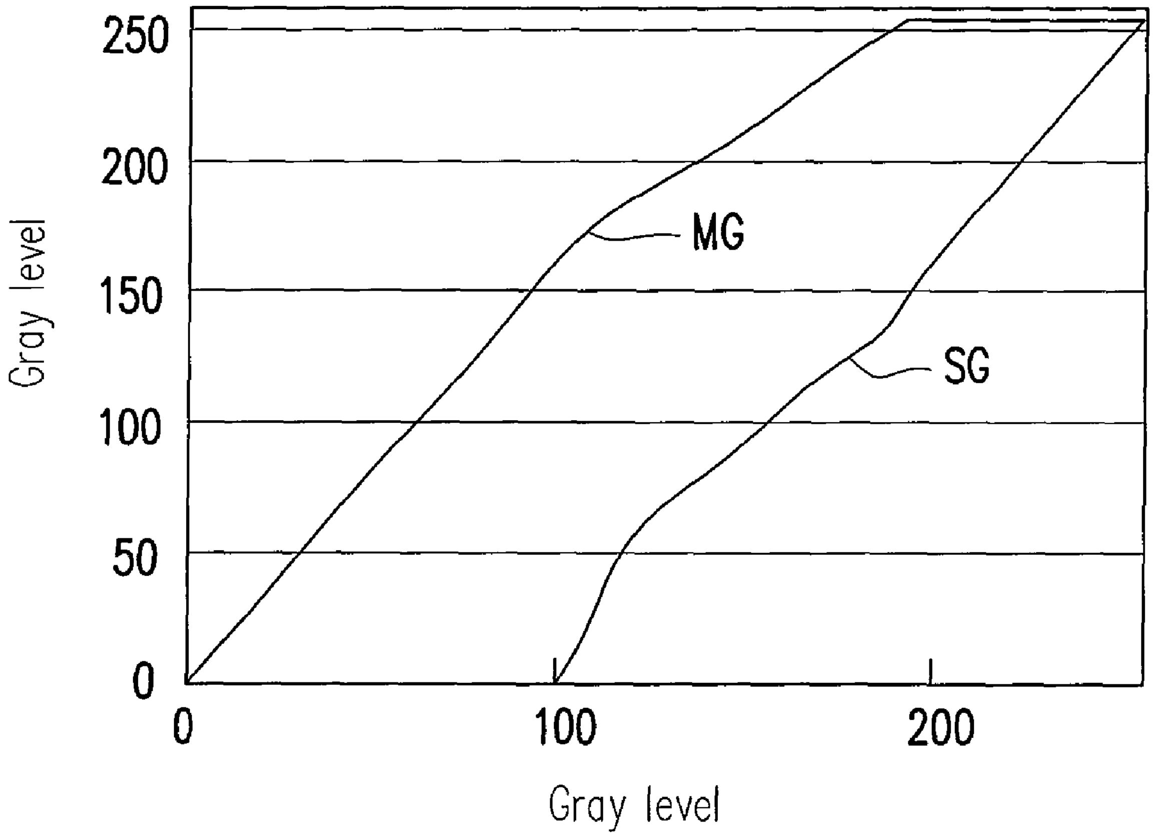
FIG. 3 is a schematic diagram illustrating a gray gamma curve MG and a gray gamma curve SG required for determining gray levels of the M sub-pixel and the S sub-pixel of type one and type two corresponding to a target gray level.

Moreover, the first lighted sub-pixel within the two sub-pixels is referred to as M sub-pixel, and the second lighted sub-pixel within the two sub-pixels is referred to as S sub-pixel. When the area ratio of the M sub-pixel and the S sub-pixel is 1:2, and a transmittance of the M sub-pixel is constantly greater than that of the S sub-pixel, this situation is defined as type one; when the area ratio of the M sub-pixel and the S sub-pixel is 2:1, and a transmittance of the M sub-pixel is constantly greater than that of the S sub-pixel, this situation is defined as type two. In the type one and type two, the gray levels of the M sub-pixel and the S sub-pixel corresponding to a target gray level are respectively determined by gray level gamma curves MG and SG illustrated in FIG. 3.

Figure 4A:
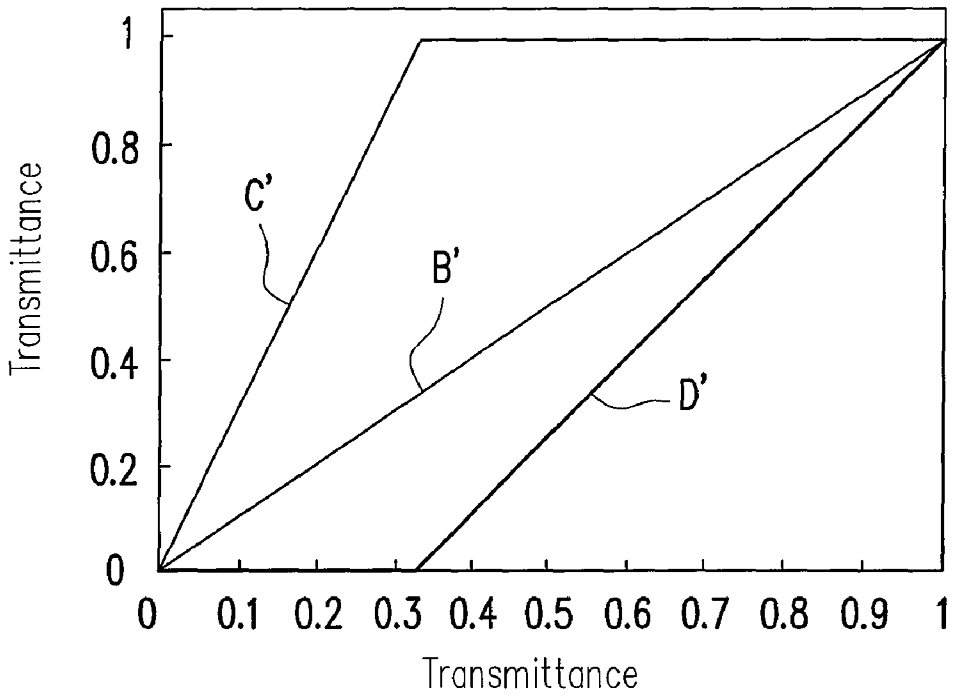
FIG. 4A is a diagram illustrating a normalized side viewing angle gamma curve C' of the M sub-pixel and a normalized side viewing angle gamma curve D' of the S sub-pixel under an utmost state of the type one.
Figure 4B:
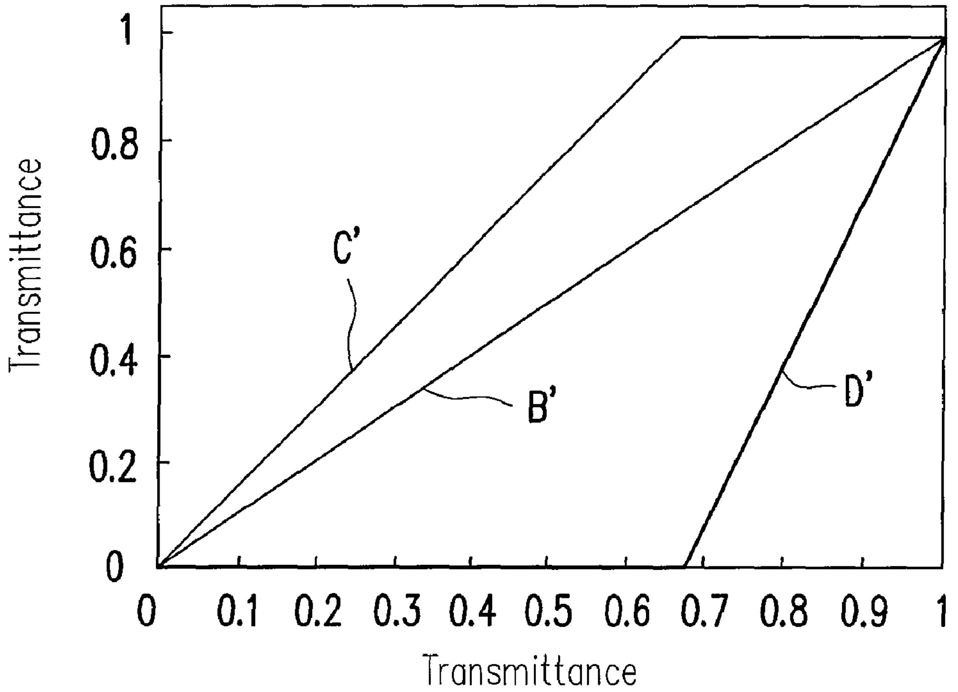
FIG. 4B is a diagram illustrating a normalized side viewing angle gamma curve C' of the M sub-pixel and a normalized side viewing angle gamma curve D' of the S sub-pixel under an utmost state of the type two.

According to the above definition, FIG. 4A is a diagram illustrating a normalized side viewing angle gamma curve C' of the M sub-pixel and a normalized side viewing angle gamma curve D' of the S sub-pixel under an utmost state of the type one. Moreover, FIG. 4B is a diagram illustrating a normalized side viewing angle gamma curve C' of the M sub-pixel and a normalized side viewing angle gamma curve D' of the S sub-pixel under an utmost state of the type two.

Figure 5:
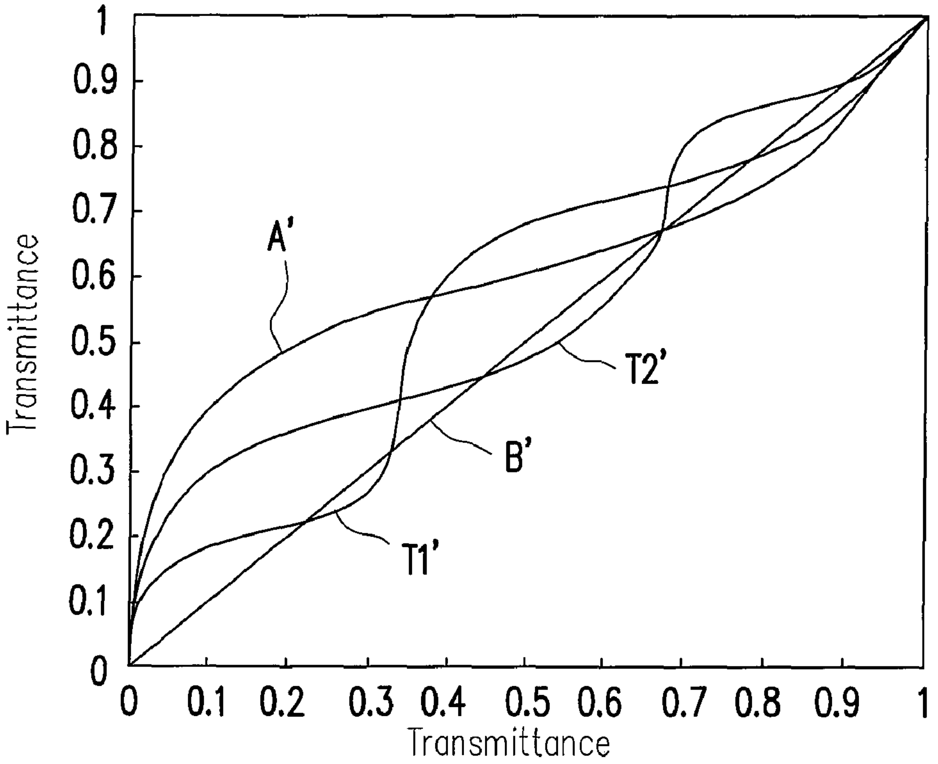
FIG. 5 is a comparison diagram of a normalized side viewing angle gamma curves A', a normalized direct viewing angle gamma curves B', an equivalent side viewing angle gamma curve T1' of normalized side viewing angle gamma curves C' and D' of type one, and an equivalent side viewing angle gamma curve T2' of normalized side viewing angle gamma curves C' and D' of type two.

To further describe the spirit of the present invention, an equivalent side viewing angle gamma curve T1' of the normalized side viewing angle gamma curves C' and D' of FIG. 4A is illustrated in FIG. 5 for comparing with the normalized side viewing angle gamma curves A' and the normalized direct viewing angle gamma curves B'. Moreover, an equivalent side viewing angle gamma curve T2' of the normalized side viewing angle gamma curves C' and D' of FIG. 4B is illustrated in FIG. 5 for comparing with the normalized side viewing angle gamma curves A' and the normalized direct viewing angle gamma curves B'.

Figure 6A:
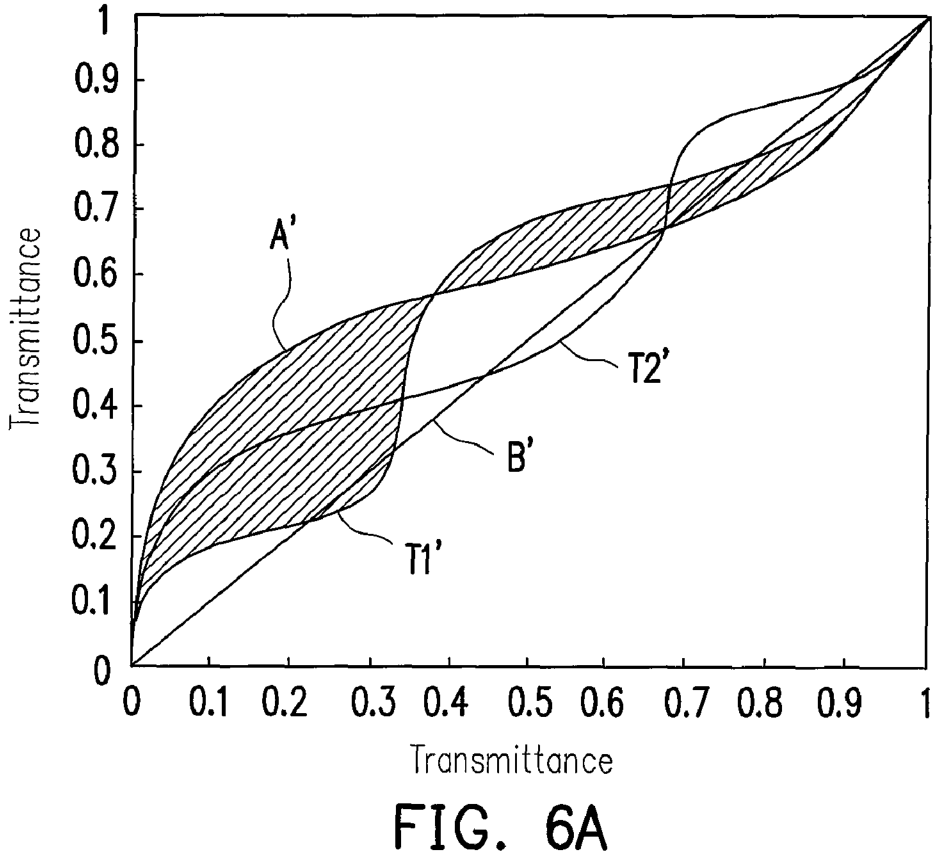
FIG. 6A is a schematic diagram illustrating an adjustable region of the equivalent side viewing angle gamma curve T1' of the type one.
Figure 6B:
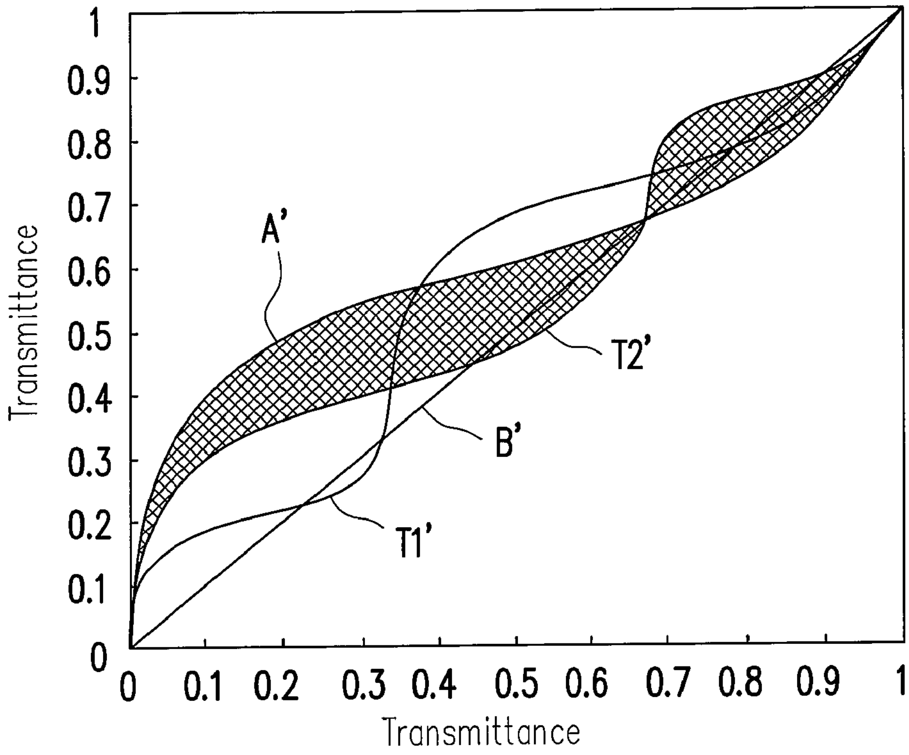
FIG. 6B is a schematic diagram illustrating an adjustable region of the equivalent side viewing angle gamma curve T2' of the type two.

Referring to FIG. 5, the equivalent side viewing angle gamma curve T1' of the type one has a better effect for mitigating the colour washout phenomenon of the colours with low gray levels, while the equivalent side viewing angle gamma curve T2' of the type two has a better effect for mitigating the colour washout phenomenon of the colours with high gray levels. Moreover, an oblique region formed between the equivalent side viewing angle gamma curve T1' of the type one and the normalized side viewing angle gamma curves A' is an adjustable region of the equivalent side viewing angle gamma curve T1' of the type one, shown as FIG. 6A; and a grid region formed between the equivalent side viewing angle gamma curve T2' of the type two and the normalized side viewing angle gamma curves A' is the adjustable region of the equivalent side viewing angle gamma curve T2' of the type two, shown as FIG. 6B.

Figure 6C:
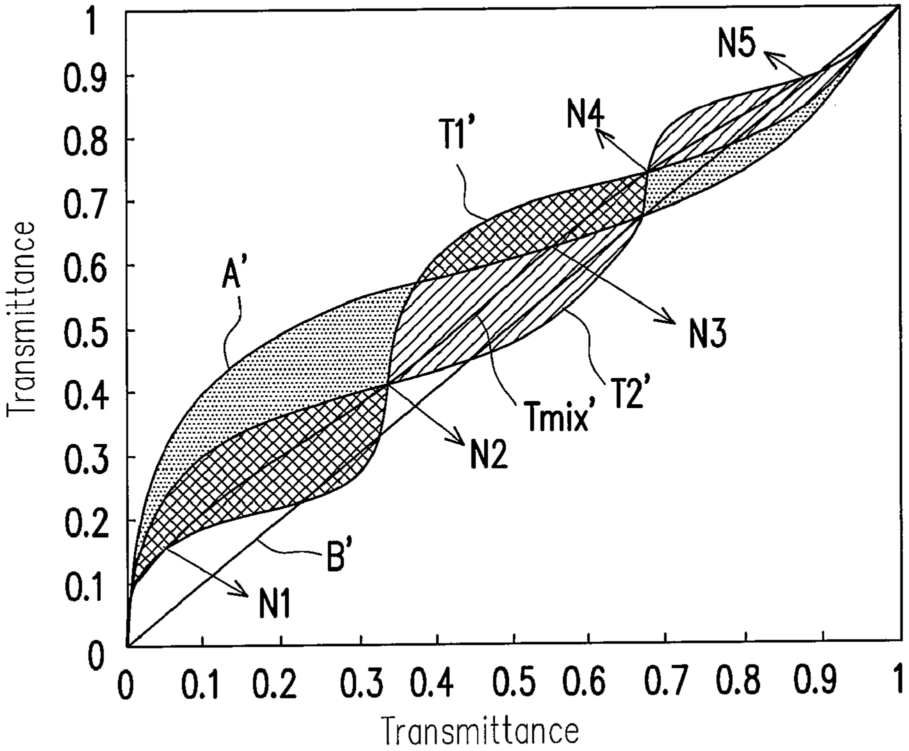
FIG. 6C is a schematic diagram illustrating an overlapped adjustable region of the equivalent side viewing angle gamma curve T1' of the type one and the equivalent side viewing angle gamma curve T2' of the type two.

Therefore, if the adjustable region of the equivalent side viewing angle gamma curve T1' of the type one and the adjustable region of the equivalent side viewing angle gamma curve T2' of the type two are combined, approximately three regions may be divided as shown in FIG. 6C, wherein the oblique region is only the adjustable region of the equivalent side viewing angle gamma curve T1' of the type one, the grid region is only the adjustable region of the equivalent side viewing angle gamma curve T2' of the type two, and the dot region is the adjustable region of the equivalent side viewing angle gamma curve T1' of the type one and the equivalent side viewing angle gamma curve T2' of the type two.

Referring to FIG. 6C, if a side viewing angle gamma curve with a slop similar to that of the normalized direct viewing angle gamma curves B' is about to be illustrated within the three regions of FIG. 6C (for example, a normalized mixed side viewing angle gamma curve Tmix' illustrated in FIG. 6C), first, the gamma curve Tmix' may start from a lowest gray level (i.e. the gray level 0) of the equivalent side viewing angle gamma curve T1' of the type one and extend to a node N1. Next, the gamma curve Tmix' extends to a node N2, while maintaining the slope of 1. Next, the gamma curve Tmix' extends to a node N4, while again as far as possible maintaining the slope of 1. Next, the gamma curve Tmix' gently extends to a node N5 after passing through the node N4. Finally, the gamma curve Tmix' extends to a highest gray level (i.e. the gray level 255) along with the equivalent side viewing angle gamma curve T2' of the type two.

According to the normalized mixed side viewing angle gamma curve Tmix' of FIG. 6C, after the gamma curve Tmix' passes through the node N2, the region is alternated, i.e., the region is changed from the oblique region into the grid region. Moreover, after the gamma curve Tmix' passes through the node N3, the region is again alternated, i.e., the region is changed from the grid region into the oblique region. Again, after the gamma curve Tmix' passes through the node N4, the region is alternated, i.e., the region is changed from the oblique region into the grid region. In this case, a transmittance of the M sub-pixel is not constantly higher than that of the S sub-pixel, and such situation is defined as a type three. In the type three, the gray levels of the M sub-pixel and the S sub-pixel corresponding to a target gray level are respectively determined by gray level gamma curves MG' and SG' illustrated in FIG. 7.

Figure 8:
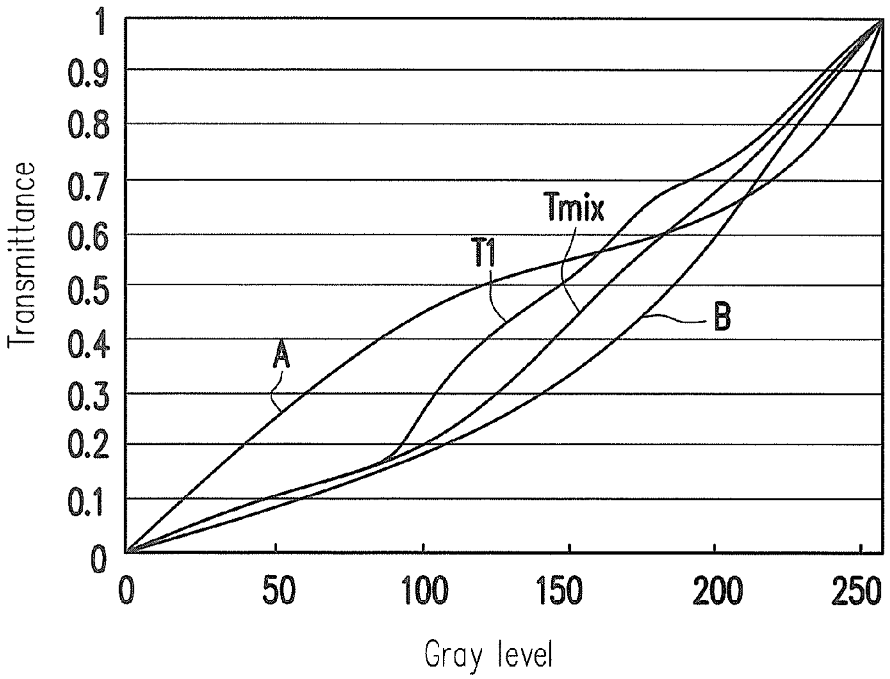
FIG. 8 is a schematic diagram illustrating an anti-normalized result of the normalized side viewing angle gamma curve A', the normalized direct viewing angle gamma curve B', the equivalent side viewing angle gamma curve T1' of the type one, and the normalized mixed side viewing angle gamma curve Tmix' of FIG. 6C.

Accordingly, to further describe the spirit of the present invention, the equivalent side viewing angle gamma curve T1' of the type one, the normalized mixed side viewing angle gamma curve Tmix', the normalized side viewing angle gamma curve A' and the normalized direct viewing angle gamma curve B' are respectively anti-normalized, and a result thereof is shown in FIG. 8. According to FIG. 8, the anti-normalized mixed side viewing angle gamma curve Tmix is rather closed to the direct viewing angle gamma curve B, and therefore the colour washout phenomenon of the colours of all gray levels (i.e. the gray levels 0~255) may be effectively mitigated.

The above description is based on an area ratio between the M sub-pixel and the S sub-pixel being 1:2. However, according to a plurality of experiment, the area ratio of the M sub-pixel and the S sub-pixel may be between 3:7 and 4:6.

Figure 9:
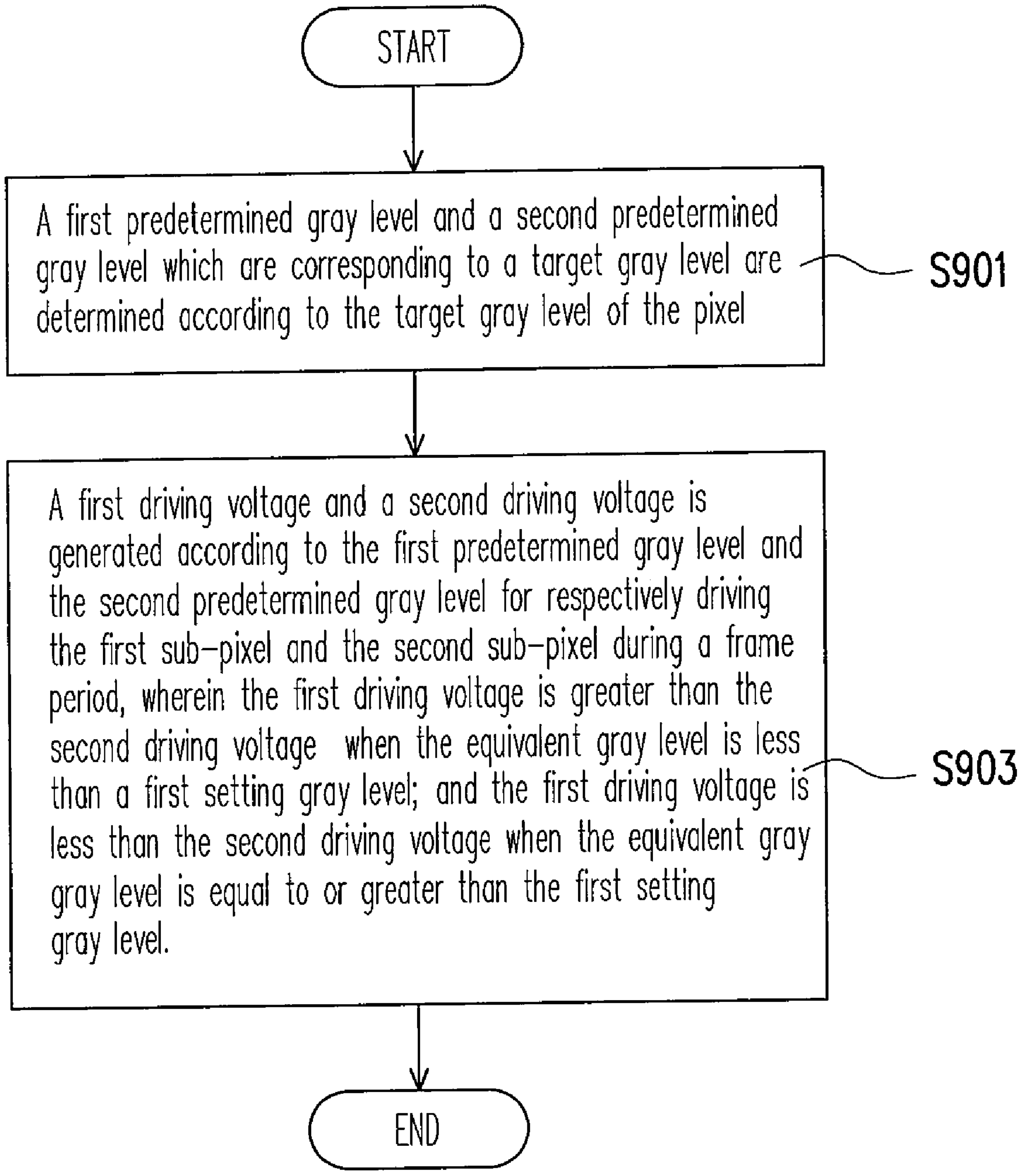
FIG. 9 is a flowchart of a pixel driving method according to an embodiment of the present invention.

According to the aforementioned disclosure, a pixel driving method based on spatial concept will be described below. FIG. 9 is a flowchart of a pixel driving method according to an embodiment of the present invention. Referring to FIG. 9, the pixel driving method includes the following steps. First, in step S901, a first predetermined gray level and a second predetermined gray level which are corresponding to a target gray level are determined according to the target gray level of the pixel, wherein an equivalent gray level corresponding to the first predetermined gray level and the second predetermined gray level is equal to the target gray level.

Figure 7:
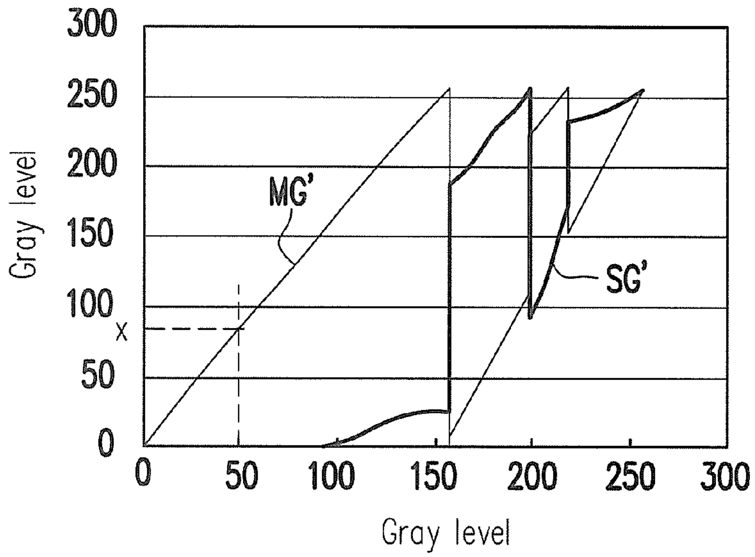
FIG. 7 is a schematic diagram illustrating a gray gamma curve MG' and a gray gamma curve SG' required for determining gray levels of the M sub-pixel and the S sub-pixel of type three corresponding to a target gray level.

In the step S901, the first predetermined gray level and the second predetermined gray level are determined by a look-up table, wherein the table look-up is established by the gray level gamma curves MG' and SG' of FIG. 7. To be specific, if the target gray level of the pixel is 50 (i.e. 50 on the horizontal axis of FIG. 7), the corresponding gray levels of the gray gamma curves MG' and SG' (i.e. x and 0 on the vertical axis of FIG. 7) is the first predetermined gray level and the second predetermined gray level.

Next, in step S903, a first driving voltage and a second driving voltage is generated according to the first predetermined gray level and the second predetermined gray level for respectively driving the first sub-pixel (i.e. the M sub-pixel) and the second sub-pixel (i.e. the S sub-pixel) during a frame period, wherein the first driving voltage is greater than the second driving voltage (i.e. the transmittance of the M sub-pixel is greater than that of the S sub-pixel) when the equivalent gray level is less than a first setting gray level; and the first driving voltage is less than the second driving voltage (i.e. the transmittance of the M sub-pixel is less than that of the S sub-pixel) when the equivalent gray level is equal to or greater than the first setting gray level.

In the present embodiment, the first driving voltage is greater than the second driving voltage (i.e. the transmittance of the M sub-pixel is greater than that of the S sub-pixel) when the equivalent gray level is equal to or greater than a second setting gray level, wherein the second setting gray level is greater than the first setting gray level. Moreover, the first driving voltage is less than the second driving voltage (i.e. the transmittance of the M sub-pixel is less than that of the S sub-pixel) when the equivalent gray level is equal to or greater than a third setting gray level, wherein the third setting gray level is greater than the second setting gray level.

It should be noted that the first setting gray level, the second setting gray level and the third setting gray level are determined by a gamma curve actually measured under a direct viewing angle of the pixel (i.e. the normalized direct viewing angle gamma curve B' of FIG. 6C) and a gamma curve actually measured under a side viewing angle of the pixel (i.e. the equivalent side viewing angle gamma curve T1' of the type one, the equivalent side viewing angle gamma curve T2' of the type two and the normalized side viewing angle gamma curve A' of FIG. 6C).

In brief, the first setting gray level, the second setting gray level and the third setting gray level are the gray levels in accordance with the transmittances respectively corresponding to the nodes N2, N3 and N4 of FIG. 6C. To be specific, the transmittance corresponding to the node N2 of FIG. 6C is about 0.32, and the gray level thereof is then a little higher than 150 with reference of FIG. 1. The transmittance corresponding to the node N3 of FIG. 6C is about 0.58, and the gray level thereof is about 200 with reference of FIG. 1. The transmittance corresponding to the node N4 of FIG. 6C is about 0.68, and the gray level thereof is a little higher than 220 with reference of FIG. 1.

As described above, when the pixel is driven according to the pixel driving method of the present invention, the at least two sub-pixels (i.e. the M sub-pixel and the S sub-pixel) within the pixel do not have such features that one of the sub-pixels is constantly brighter than another sub-pixel as that of a conventional technique. Conversely, when the equivalent obtained gray level after at least two independent sub-pixels within a pixel are respectively driven is equal to or greater than a setting gray level (i.e. the first setting gray level, the second setting gray level and the third setting gray level), one of the sub-pixels is not constantly brighter than another sub-pixel.

Therefore, the actual measured side viewing angle gamma curve (i.e. the anti-normalized mixed side viewing angle gamma curve Tmix of FIG. 8) of the LCD driven based on the pixel driving method of the present embodiment is rather close to the actual measured direct viewing angle gamma curve (i.e. the direct viewing angle gamma curve B of FIG. 1), and accordingly the pixel driving method of the present embodiment may mitigate the colour washout phenomenon of the colours of all the gray levels (i.e. the gray levels 0~255), such that the colour washout phenomenon appeared under large viewing angle of the LCD is effectively solved.

However, according to the spirit of the present invention, the pixel driving method based on the spatial concept may also converted into the pixel driving method based on a temporal concept. According to the above disclosure, the pixel driving method based on the temporal concept will be described in detail below. In this pixel driving method, each pixel of the LCD panel is activated and driven via a single scan line.

Figure 10:
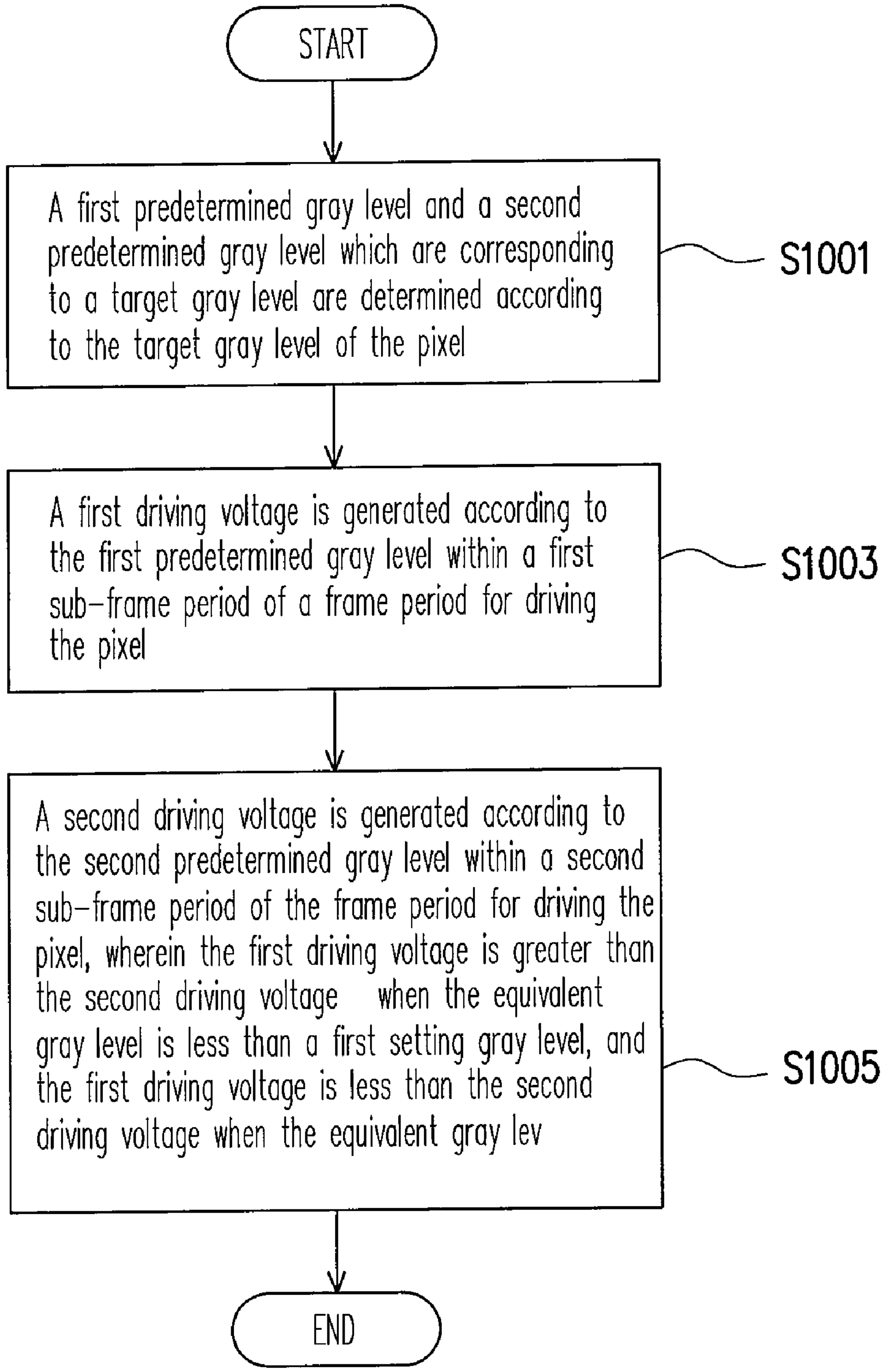
FIG. 10 is a flowchart of a pixel driving method according to another embodiment of the present invention.

FIG. 10 is a flowchart of a pixel driving method according to another embodiment of the present invention. Referring to FIG. 10, the pixel driving method of the present embodiment includes the following steps. First, in step S1001, a first predetermined gray level and a second predetermined gray level which are corresponding to a target gray level is determined according to a target gray level of the pixel, wherein an equivalent gray level corresponding to the first predetermined gray level and the second predetermined gray level is equal to the target gray level. In the step S1001, the first predetermined gray level and the second predetermined gray level are determined by table look-up, wherein the look-up table is also established by the gray level gamma curves MG' and SG' of FIG. 7.

Next, in step S1003, a first driving voltage is generated according to the first predetermined gray level within a first sub-frame period of a frame period, so as to drive the pixel. Finally, in step S1005, a second driving voltage is generated according to the second predetermined gray level within a second sub-frame period of the frame period, so as to drive the pixel, wherein the first driving voltage is greater than the second driving voltage (i.e. the transmittance of the pixel during the first sub-frame period is greater than that during the second sub-pixel period) when the equivalent gray level is less than a first setting gray level, and the first driving voltage is less than the second driving voltage (i.e. the transmittance of the pixel during the first sub-frame period is less than that during the second sub-pixel period) when the equivalent gray level is equal to or greater than the first setting gray level.

In the present embodiment, the first driving voltage is greater than the second driving voltage (i.e. the transmittance of the pixel during the first sub-frame period is greater than that during the second sub-pixel period) when the equivalent gray level is equal to or greater than a second setting gray level, wherein the second setting gray level is greater than the first setting gray level. Moreover, the first driving voltage is less than the second driving voltage (i.e. the transmittance of the pixel during the first sub-frame period is less than that during the second sub-pixel period) when the equivalent gray level is equal to or greater than a third setting gray level, wherein the third setting gray level is greater than the second setting gray level.

Similarly, the first setting gray level, the second setting gray level and the third setting gray level are determined by a gamma curve actually measured under a direct viewing angle of the pixel (i.e. the normalized direct viewing angle gamma curve B' of FIG. 6C) and a gamma curve actually measured under a side viewing angle of the pixel (i.e. the equivalent side viewing angle gamma curve T1' of the type one, the equivalent side viewing angle gamma curve T2' of the type two and the normalized side viewing angle gamma curve A' of FIG. 6C). In brief, the first setting gray level, the second setting gray level and the third setting gray level are the gray levels in accordance with the transmittances respectively corresponding to the nodes N2, N3 and N4 of FIG. 6C.

As described above, when the pixel is driven according to the pixel driving method of the present invention, the pixel is not constantly brighter or constantly darker during one of the two sub-frame periods as that of a conventional technique. Conversely, when the equivalent gray level obtained after the pixel is separately driven within the frame period is equal to or greater than a setting gray level (i.e. the first setting gray level, the second setting gray level and the third setting gray level), the pixel is constantly bright or constantly dark during a non-fixed time segment (i.e. the first sub-frame period and the second sub-frame period) of the frame period.

Therefore, the actual measured side viewing angle gamma curve (i.e. the anti-normalized mixed side viewing angle gamma curve Tmix of FIG. 8) of the LCD driven based on the pixel driving method of the present embodiment is still rather close to the actual measured direct viewing angle gamma curve (i.e. the direct viewing angle gamma curve B of FIG. 1), and accordingly the pixel driving method of the present embodiment may also mitigate the colour washout phenomenon of the colours of all the gray levels (i.e. the gray levels 0~255), such that the colour washout phenomenon appeared under large viewing angle of the LCD is effectively solved.

It should be noted that the two pixel driving methods of the present invention may be applied to any LCD with a direct viewing angle gamma curve and a side viewing angle gamma curve thereof being different. Examples include a multi-domain vertically alignment (MVA) LCD, a multi-domain horizontal alignment (MHA) LCD, a twisted nematic plus wide viewing film (TN+film) LCD, and an in-plane switching (IPS) LCD.

In summary, the present invention provides two pixel driving methods, one pixel driving method is based on the spatial concept, by which when the equivalent gray level obtained after at least two independent sub-pixels within the pixel are respectively driven is equal to or greater than the setting gray level, one of the sub-pixels is not constantly brighter than another sub-pixel.

Another pixel driving method is based on the temporal concept, by which when the equivalent gray level obtained after the pixel is separately driven within the frame period is equal to or greater than the setting gray level, the pixel is constantly bright or constantly dark within the non-fixed time segment of the frame period. However, no matter which pixel driving method is applied, the colour washout phenomenon of the colours of all gray levels is mitigated, and therefore the colour washout phenomenon appeared under large viewing angle of the LCD is effectively solved.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for driving a pixel, the pixel comprising at least one first sub-pixel and at least one second sub-pixel, the method comprising:

determining a first predetermined gray level and a second predetermined gray level which are corresponding to a target gray level according to the target gray level of the pixel, wherein an equivalent gray level corresponding to the first predetermined gray level and the second predetermined gray level is equal to the target gray level; and generating a first driving voltage and a second driving voltage according to the first predetermined gray level and the second predetermined gray level for respectively driving the first sub-pixel and the second sub-pixel during a frame period, wherein the first driving voltage is greater than the second driving voltage when the equivalent gray level is less than a first setting gray level, and the first driving voltage is less than the second driving voltage when the equivalent gray level is equal to or greater than the first setting gray level, wherein the first driving voltage is greater than the second driving voltage when the equivalent gray level is equal to or greater than a second setting gray level, wherein the second setting gray level is greater than the first setting gray level, wherein the first driving voltage is less than the second driving voltage when the equivalent gray level is equal to or greater than a third setting gray level, wherein the third setting gray level is greater than the second setting gray level.

2. The method as claimed in claim 1, wherein the first predetermined gray level and the second predetermined gray level are determined by a look-up table.

3. The method as claimed in claim 1, wherein the first setting gray level, the second setting gray level and the third setting gray level are determined by a gamma curve actually measured under a direct viewing angle of the pixel and a gamma curve actually measured under a side viewing angle of the pixel.

4. The method as claimed in claim 1, wherein an area ratio of the first sub-pixel and the second sub-pixel is between 3:7 and 4:6.

5. A method for driving a pixel, comprising:

determining a first predetermined gray level and a second predetermined gray level which are corresponding to a target gray level according to the target gray level of the pixel, wherein an equivalent gray level corresponding to the first predetermined gray level and the second predetermined gray level is equal to the target gray level;

generating a first driving voltage according to the first predetermined gray level for driving the pixel during a first sub-frame period of a frame period; and generating a second driving voltage according to the second predetermined gray level for driving the pixel during a second sub-frame period of a frame period, wherein the first driving voltage is greater than the second driving voltage when the equivalent gray level is less than a first setting gray level, and the first driving voltage is less than the second driving voltage when the equivalent gray level is equal to or greater than the first setting gray level, wherein the first driving voltage is greater than the second driving voltage when the equivalent gray level is equal to or greater than a second setting gray level, wherein the second setting gray level is greater than the first setting gray level, wherein the first driving voltage is less than the second driving voltage when the equivalent gray level is equal to or greater than a third setting gray level, wherein the third setting gray level is greater than the second setting gray level.

6. The method as claimed in claim 5, wherein the first predetermined gray level and the second predetermined gray level are determined by a look-up table.

7. The method as claimed in claim 5, wherein the first setting gray level, the second setting gray level and the third setting gray level are determined by a gamma curve actually measured under a direct viewing angle of the pixel and a gamma curve actually measured under a side viewing angle of the pixel.

8. The method as claimed in claim 5, wherein a timing ratio of the first sub-frame period and the second sub-frame period is between 3:7 and 4:6.

* * * * *